(12) United States Patent
Jajtic et al.

(10) Patent No.: US 7,800,256 B2
(45) Date of Patent: Sep. 21, 2010

(54) ELECTRIC MACHINE

(75) Inventors: Zeljko Jajtic, München (DE); Christian Volmert, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/689,122

(22) Filed: Mar. 21, 2007

(65) Prior Publication Data

US 2007/0222304 A1 Sep. 27, 2007

Related U.S. Application Data

(63) Continuation of application No. PCT/EP2005/054630, filed on Sep. 16, 2005.

(30) Foreign Application Priority Data

Sep. 22, 2004 (DE) .................. 10 2004 045 992

(51) Int. Cl.
*H02K 21/00* (2006.01)
*H02K 23/04* (2006.01)

(52) U.S. Cl. .................. 310/12.01; 310/49.39; 310/114

(58) Field of Classification Search .......... 310/12, 310/114, 49.39; *H02K 23/04, 21/00*
See application file for complete search history.

(56) References Cited

U.S. PATENT DOCUMENTS

| | | | |
|---|---|---|---|
| 3,671,787 A * | 6/1972 | Herron | 310/154.11 |
| 3,878,411 A * | 4/1975 | Nocito et al. | 310/12.19 |
| 3,984,711 A * | 10/1976 | Kordik | 310/49.46 |
| 4,011,479 A * | 3/1977 | Volkrodt | 310/186 |
| 4,286,180 A * | 8/1981 | Langley | 310/12 |
| 4,335,338 A * | 6/1982 | Sawyer | 318/135 |
| 4,501,980 A * | 2/1985 | Welburn | 310/12.15 |
| 4,509,001 A * | 4/1985 | Wakabayashi et al. | 318/687 |
| 4,516,046 A * | 5/1985 | Mercier | 310/154.11 |
| 4,678,971 A * | 7/1987 | Kanazawa et al. | 318/135 |

(Continued)

FOREIGN PATENT DOCUMENTS

EP 1 045 509 A1 10/2000

(Continued)

OTHER PUBLICATIONS

Iwabuchi N et al: "A Novel High-Torque Reluctance Motor With Rare-Earth Magnet" IEEE Transactions on Industry Applications, IEEE Service Center, Piscataway, NJ, US, vol. 30, No. 3, May 1, 1994, pp. 609-613, XP000459019, ISSN: 0093-9994, pp. 609; figures 1, 2, 8-11.

*Primary Examiner*—Quyen Leung
*Assistant Examiner*—John K Kim
(74) *Attorney, Agent, or Firm*—Henry M. Feiereisen; Ursula B. Day

(57) ABSTRACT

A linear or rotating electric synchronous machine includes a reluctance-secondary part, and a primary part, provided with a coil and permanent magnets. The primary part has teeth, with each tooth surrounded by a coil defining a coil axis. Arranged in each tooth is a permanent magnet which is surrounded by the coil and extends extending in parallel relationship to the coil axis of the coil. The secondary part is constructed for guiding a magnetic field and has teeth which define with the teeth of the primary part an air gap. The permanent magnet defines a magnetization direction in parallel to an air gap plane of the air gap, with the magnetization direction reversing from tooth to tooth.

6 Claims, 14 Drawing Sheets

U.S. PATENT DOCUMENTS

| | | | |
|---|---|---|---|
| 4,728,830 A * | 3/1988 | Gamble | 310/12.12 |
| 4,794,286 A * | 12/1988 | Taenzer | 310/12.19 |
| 4,857,782 A * | 8/1989 | Tokio et al. | 310/12.19 |
| 4,972,108 A * | 11/1990 | Venturini | 310/12 |
| 5,010,262 A * | 4/1991 | Nakagawa et al. | 310/12.21 |
| 5,218,250 A * | 6/1993 | Nakagawa | 310/12 |
| 5,965,962 A * | 10/1999 | Hinds | 310/12.31 |
| 6,078,114 A * | 6/2000 | Bessette et al. | 310/12 |
| 6,087,742 A * | 7/2000 | Maestre | 310/12 |
| 6,093,992 A | 7/2000 | Akemakou | |
| RE37,027 E | 1/2001 | Török | |
| 6,252,325 B1 * | 6/2001 | Nashiki | 310/168 |
| 6,441,515 B1 * | 8/2002 | Shimura | 310/12 |
| 6,522,035 B1 * | 2/2003 | Smit | 310/12 |
| 6,720,681 B2 * | 4/2004 | Hsiao | 310/12 |
| 7,034,422 B2 * | 4/2006 | Ramu | 310/114 |
| 7,148,590 B1 * | 12/2006 | Lampson | 310/12.18 |
| 7,193,339 B2 * | 3/2007 | Uchida | 310/12.19 |
| 2003/0122440 A1 * | 7/2003 | Horst | 310/181 |
| 2003/0141769 A1 | 7/2003 | Kubo | |
| 2004/0155554 A1 * | 8/2004 | Morgante | 310/266 |
| 2006/0131967 A1 * | 6/2006 | Lin et al. | 310/12 |
| 2006/0237567 A1 * | 10/2006 | Castelli et al. | 242/365.1 |

FOREIGN PATENT DOCUMENTS

| | | |
|---|---|---|
| JP | 52/054108 A | 5/1977 |
| JP | 56 083453 A | 6/1980 |
| JP | 58/165068 A | 9/1983 |
| JP | 59/ 086469 A | 5/1984 |
| JP | 2000/152599 A | 5/2000 |
| JP | 2001/054274 A | 2/2001 |
| JP | 2002/034232 A | 1/2002 |
| JP | 2002/142422 | 5/2002 |
| JP | 2002/199679 A | 7/2002 |

* cited by examiner

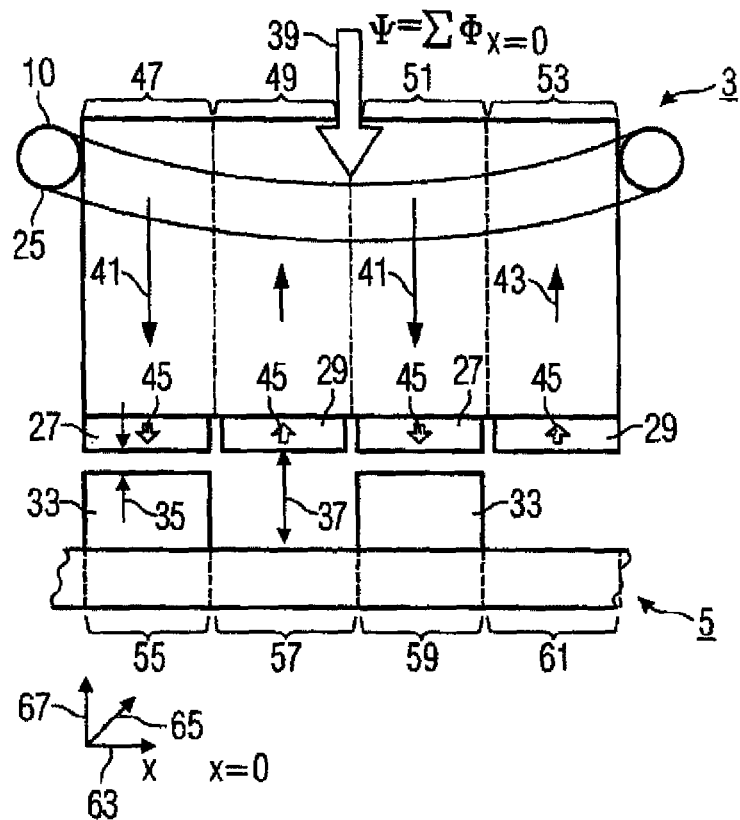
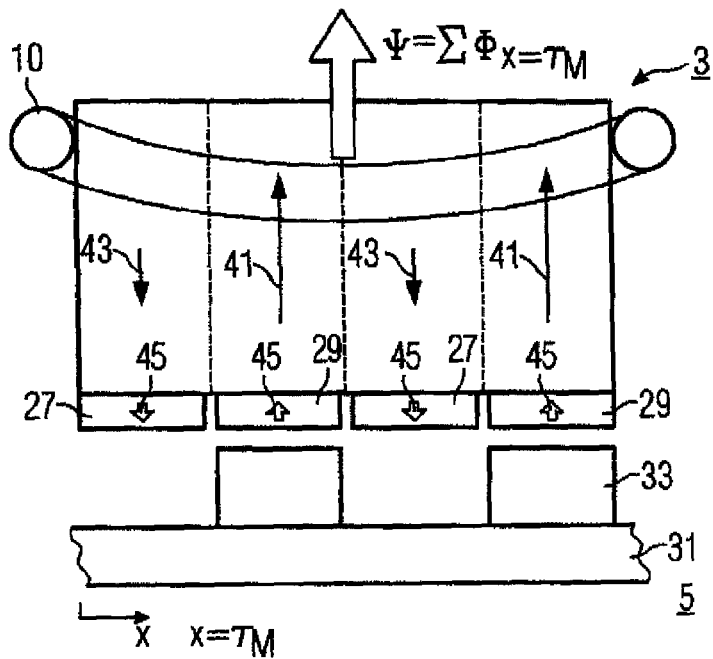

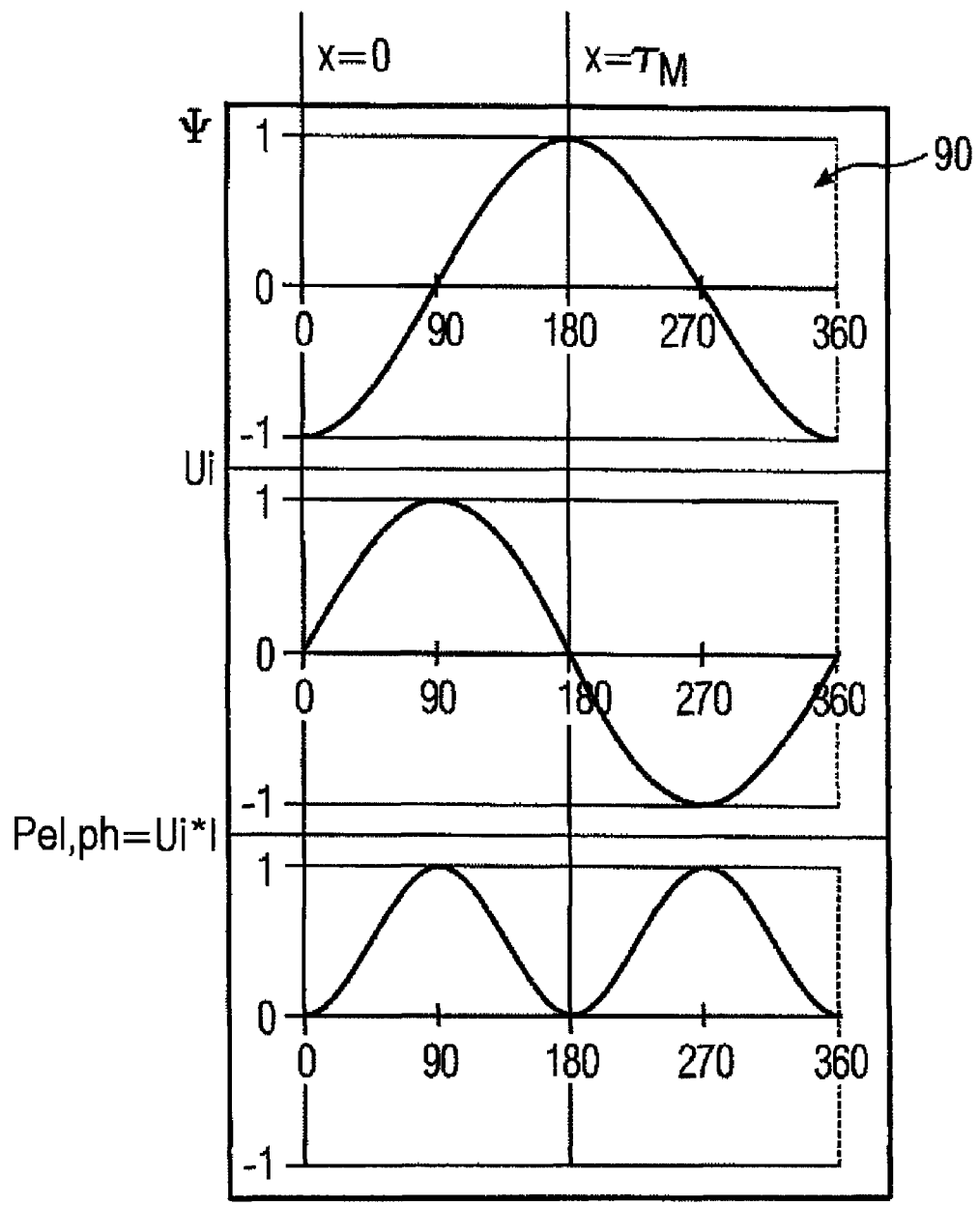

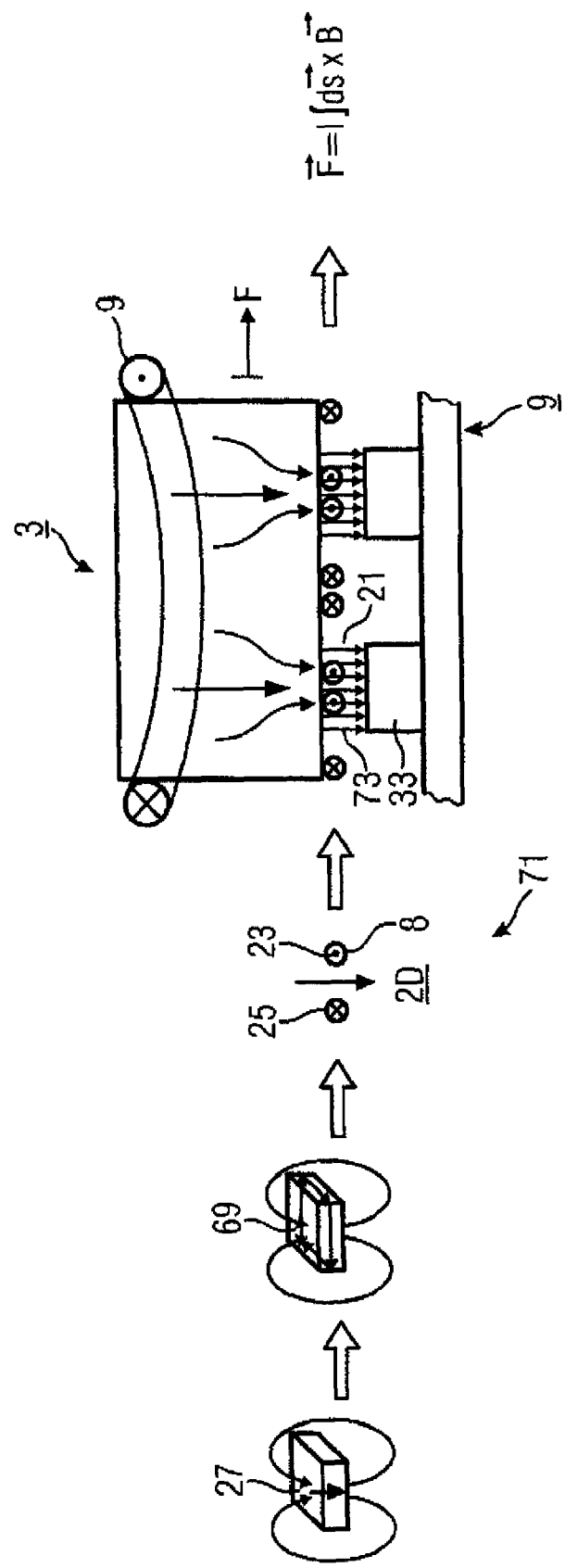

FIG 9
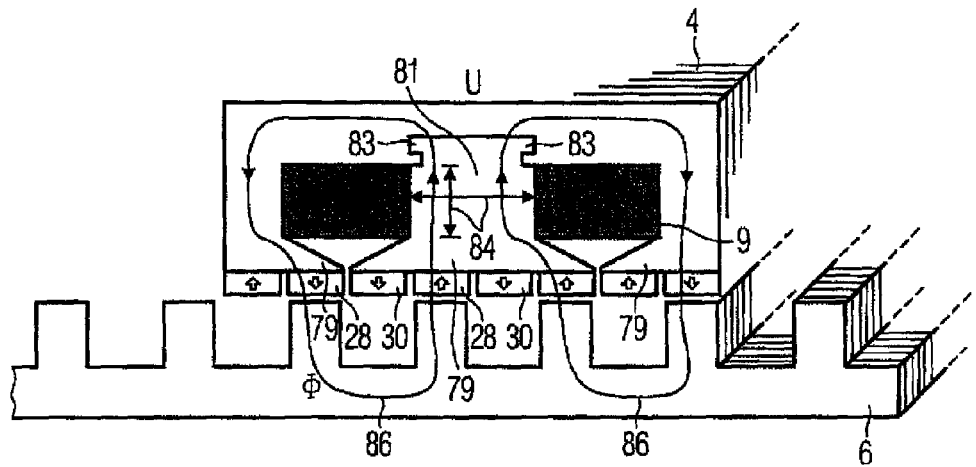
FIG 10
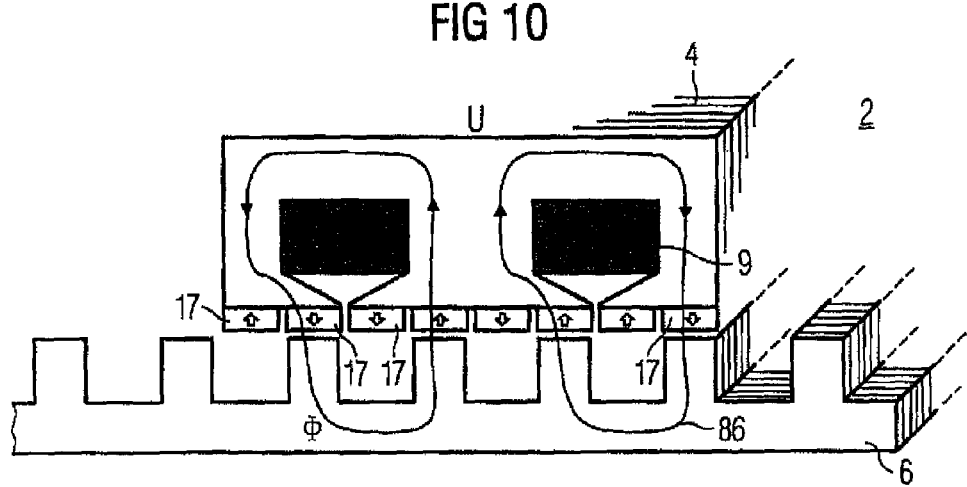
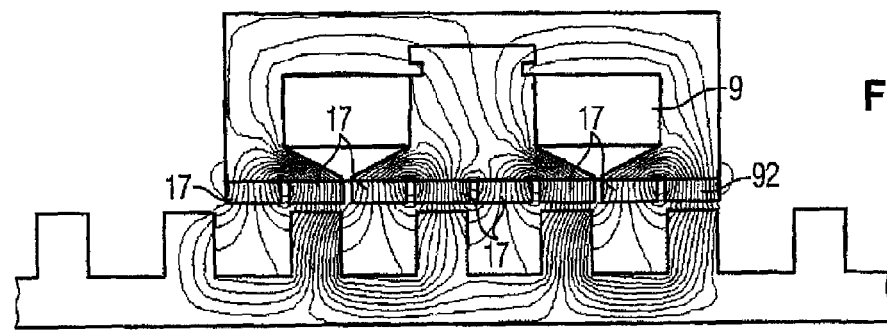
FIG 10a

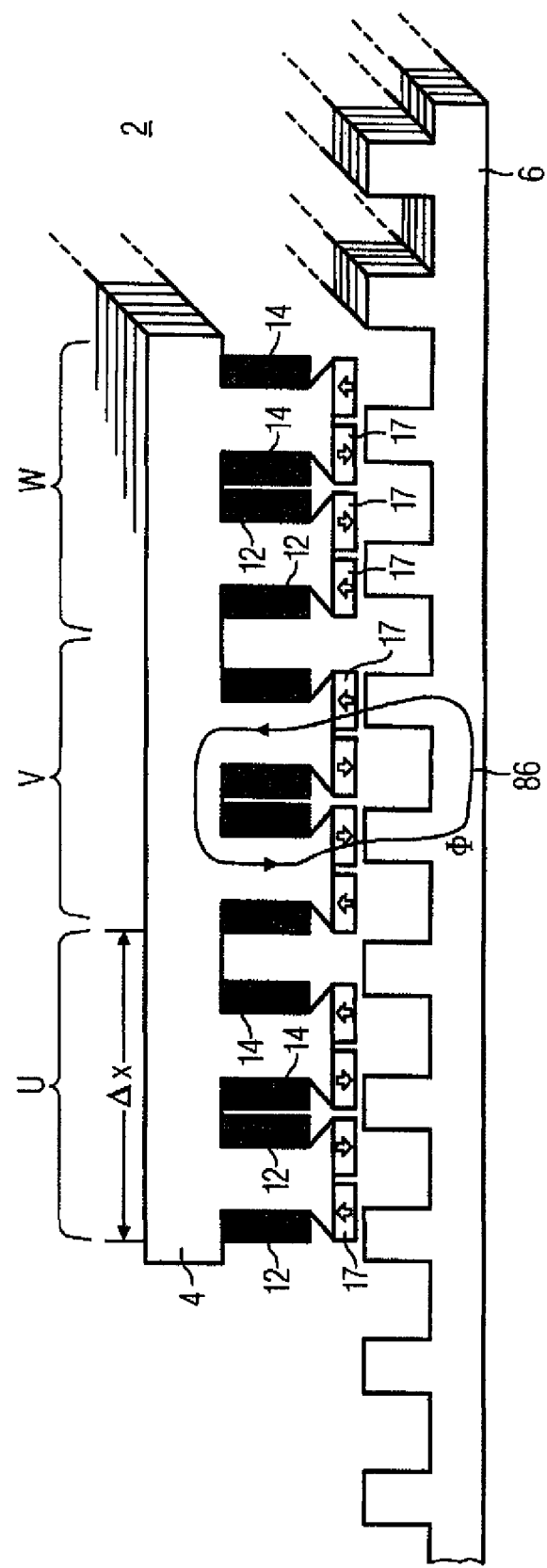

FIG 13
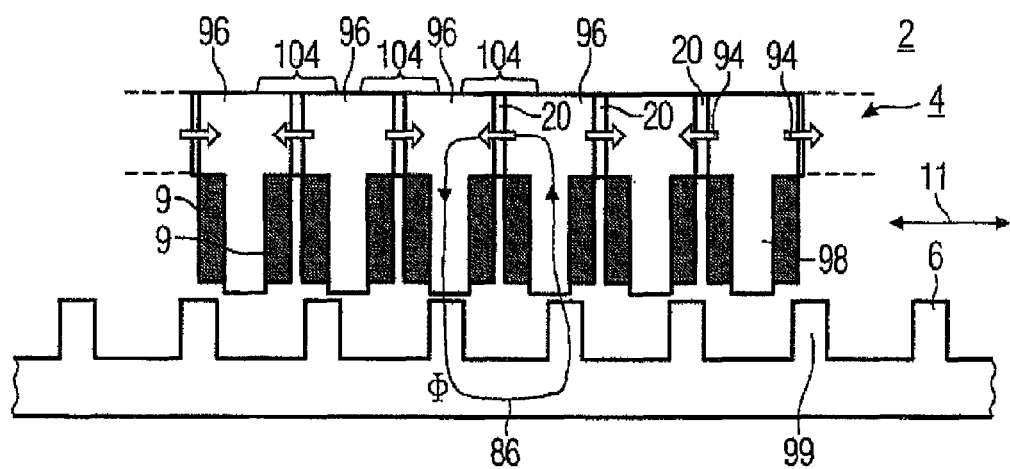
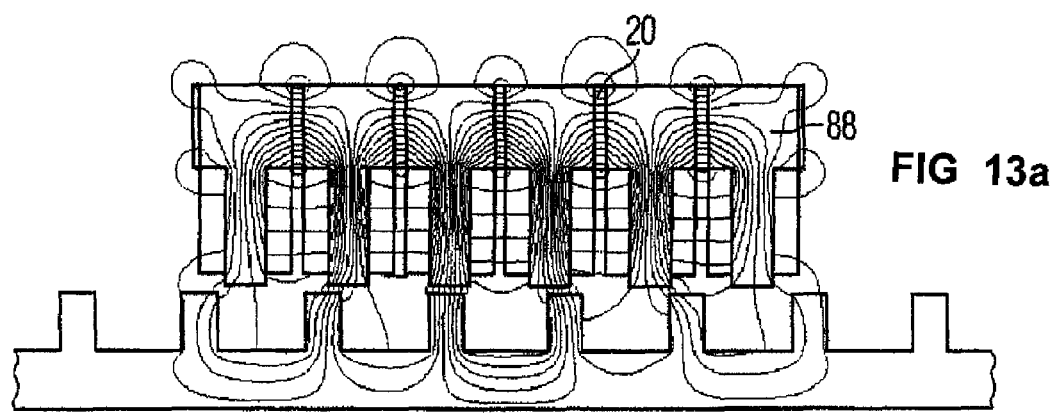
FIG 13a

ELECTRIC MACHINE

CROSS-REFERENCES TO RELATED APPLICATIONS

This application is a continuation of prior filed copending PCT International application no. PCT/EP2005/054630, filed Sep. 16, 2005, which designated the United States and has been published but not in English as International Publication No. WO 2006/032638 and on which priority is claimed under 35 U.S.C. §120, and which claims the priority of German Patent Application, Serial No. 10 2004 045 992.4, filed Sep. 22, 2004, pursuant to 35 U.S.C. 119(a)-(d), the content(s) of which is/are incorporated herein by reference in its entirety as if fully set forth herein.

BACKGROUND OF THE INVENTION

The present invention relates to an electric machine, in particular a synchronous machine.

Nothing in the following discussion of the state of the art is to be construed as an admission of prior art.

In general, an electric machine has a primary part with teeth, which are each surrounded by a coil, and a secondary part with teeth, which has a means for guiding a magnetic field. In addition to the coil, at least one permanent magnet is provided in each tooth unit. Such an electric machine is described, for example, in the article "A Novel High-Torque Reluctance Motor with Rare-Earth Magnet" by N. Iwabuchi et al. in IEEE Transactions on Industry Applications 30(1994), May/June, No. 3, New York, US, pages 609 to 613. As disclosed in this article, the permanent magnets are each fitted at the end region of the teeth, the polarity of the magnets alternating within a tooth and also when bridging the teeth from permanent magnet to permanent magnet.

U.S. patent application Publ. No. 2003/0122440 A1, published July 3, describes a disposition of the permanent magnets within a tooth. For example, one permanent magnet is arranged in a tooth in an end region thereof. An alternative involves the arrangement of a skewed permanent magnet in every second tooth of the primary part.

U.S. Reissued Pat. No. RE37,027 E describes a primary part having two coils and two permanent magnets at different points.

It would therefore be desirable and advantageous to provide an improved electric machine which obviates prior art shortcomings and which is simple in construction. Such a simplified construction is desirable in particular in the case of a synchronous machine, for example, a permanently excited synchronous machine or a separately excited synchronous machine.

SUMMARY OF THE INVENTION

According to one aspect of the present invention, an electric machine, in particular synchronous machine, includes a primary part having teeth, each tooth surrounded by a coil defining a coil axis, permanent magnet arranged in each tooth and surrounded by the coil, with the permanent magnet extending in parallel relationship to the coil axis of the coil, and a secondary part having teeth which define with the teeth of the primary part an air gap, said secondary part constructed for guiding a magnetic field, wherein the permanent magnet defines a magnetization direction in parallel to an air gap plane of the air gap, with the magnetization direction reversing from tooth to tooth permanent magnet is arranged in each tooth.

According to another aspect of the present invention, an electric machine, in particular synchronous machine, includes a primary part having teeth, each tooth surrounded by a coil, two permanent magnets arranged on each tooth, and a secondary part having teeth and constructed for guiding a magnetic field, wherein adjacent permanent magnets of neighboring teeth have a same magnetization direction.

According to yet another aspect of the present invention, an electric machine, in particular synchronous machine, includes a primary part having teeth, each tooth surrounded by a coil, with neighboring coils of adjacent teeth being respectively connected via a yoke, a permanent magnet arranged in each of the yokes, and a secondary part having teeth and constructed for guiding a magnetic field, wherein a magnetization direction of the permanent magnets reverses from yoke to yoke.

Soft iron parts can advantageously be used for the structural design of the primary part and the secondary part. The lamination of these parts reduces eddy currents. In further embodiments, the soft iron parts can also be designed to be solid and/or in the form of so-called powder-pressed parts.

By means of an electric machine according to the invention, it is possible, for example, to construct a linear motor. In the case of such a linear motor, for example permanent magnets are integrated in a coil-bearing primary part of the linear motor. This configuration has cost advantages in particular in the case of long displacement paths. The secondary part of the linear motor in this case comprises, for example, only an iron reaction rail. As a result, the reliability of the linear motor can also be increased.

The cost advantages in such a linear motor result, for example, from the fact that, until now, the linear motor, which is a synchronous linear motor, has had a primary part which can be excited electrically and which is opposite a secondary part fitted with permanent magnets. In this case, a long stator design and also a short stator design are possible. In one case, a very large amount of copper is required, and in the other case a very large amount of magnet material is required. Both entail high costs. The permanent magnets accommodated in the secondary part in already known linear motors form an open path. The magnets (permanent magnets) need to be protected over the entire length from environmental influences such as chips, oil or other impurities, which is complex. Furthermore, owing to the strong forces of attraction of the permanent magnets over the length of the secondary part, care needs to be taken to ensure protection against personal injury. These protective measures also bring about costs and technical complexity. It is possible to considerably reduce the complexity with the aid of a secondary part of the electric machine according to the invention.

The permanent magnets can be integrated in the primary part, with the result that coils (windings) and magnets (permanent magnets) are accommodated in the same part (primary part) of the electrical machine. Considerably less magnet material is required in comparison with the known motor principle for a short stator design. Since the primary part has in any case already been protected until now from environmental influences and protection against personal injury has already been taken into consideration there, when integrating the magnets in the primary part additional protective apparatuses are no longer required. The secondary part advantageously only comprises an iron reaction rail which does not represent any risk.

The electric machine according to the invention is in particular a synchronous machine. Synchronous machines can be regulated precisely and can satisfy stringent requirements for movement accuracy and positioning accuracy. The simple or compact design of the synchronous machine according to the invention results in a very wide variety of advantages, which have been touched on already in the description above.

Cogging torques occurring can be reduced in accordance with already known methods. Such methods are, for example: skewing of the permanent magnets, skewing of toothing, etc.

In an advantageous embodiment, the primary part has a modular design. Owing to the number of teeth or the corresponding windings, the motor length can be varied. This results in the possibility of adapting the rated power of the motor.

In a further configuration of the electric machine, regions of different magnetizability alternate in the secondary part. There is a different magnetizability, for example, between a soft-magnetic material, which can be produced from iron, for example, and air or plastic. By means of the alternating regions, the magnetic field can thus be guided within the secondary part.

In a further embodiment, the secondary part is designed such that it has teeth pointing towards the primary part. The useful flux is therefore guided within the secondary part via the teeth and via the return path which may be provided. When the flux is guided via the teeth, the flux can be guided, for example, in each case only via one tooth or via at least two teeth.

In a further advantageous configuration, the interspaces between the teeth, which can also be referred to as bars, for example, are filled. The filling consists of plastic, for example. Owing to the filling, no dirt can collect between the teeth, for example.

An electric machine can also be designed such that a secondary part has teeth, which are arranged at a modular spacing Tau_Sec in relation to one another. The primary part of the electric machine contains the second means for producing a magnetic excitation field, which is realized from a large number of means (for example many permanent magnets), which are arranged at a modular spacing Tau_Prim in relation to one another.

In a preferred embodiment of the electric machine, the relationship between Tau_Sec and Tau_Prim can be given by the following equation:

$$\text{Tau\_Sec} \neq n \cdot \text{Tau\_Prim}, \text{ where } n=1, 2, 3, \ldots$$

The modular spacing Tau_Sec is therefore not an integral multiple of the modular spacing Tau_Prim.

In a further advantageous configuration, the electric machine according to the invention is connected to a power converter. The power converter is in particular an inverter, which can be provided for the purpose of applying current to the first means for producing a first magnetic field. The electric machine and the power converter form a drive. The electric machine can therefore also be designed such that the primary part has a plurality of windings, it being possible for an AC voltage or an alternating current with different phase angles to be applied to different windings. Owing to the use of different phase angles, a uniform force profile can be brought about during the movement of the primary part and/or the secondary part of the electric machine. Such a uniform force profile can also be formed such that different windings of a primary part of an electric machine are phase-shifted in terms of their position with respect to the secondary part such that, as a result, more uniform force development is made possible. For example in the case of a three-phase machine (m=3), a phase offset of 120° electrical is advantageously selected.

The electric machine according to the invention may also be in the form of a rotary electric machine. The advantage of the embodiment of a rotary machine consists, for example, in the fact that particularly large electric machines with a large radius can be formed. In this case, both the rotor and the stator may be formed as the primary part or the secondary part. Advantageously, the stator is formed as the primary part, since the current supply is thereby facilitated.

In a further advantageous configuration, not only one secondary part, but at least two or more secondary parts, can be moved by means of the primary part of the electric machine. This is conceivable, for example, in a transport system in which a very wide variety of secondary parts, which bear, for example, transport bodies such as boxes, can be moved by means of a primary part. In this case, the primary part is used, for example, for one or more of the following tasks: positioning of the secondary part, acceleration of the secondary part, braking of the secondary part.

The electric machine can be designed flexibly such that either the primary part is movable or the secondary part is movable or both parts are movable.

In a further configuration of the electric machine, it has a primary part and two secondary parts. The primary part is arranged between the two secondary parts. This arrangement is designed such that a magnetic circuit, which is formed by a useful magnetic flux, is closed via the primary part and both secondary parts.

In a further configuration of the electric machine, it has two primary parts and one secondary part. The secondary part is arranged between the two primary parts. The primary parts and the secondary part can be designed such that a magnetic circuit, which is formed by a useful magnetic flux, is closed via the two primary parts and the secondary part.

However, the primary parts and the secondary part can also be designed such that a magnetic circuit, which is formed by a useful magnetic flux, is closed via in each case one primary part and the common secondary part.

The invention also relates to a transport device. The transport device advantageously has an electric machine according to the invention. The transport device has, for example, at least one primary part and at least one secondary part. If the transport device has a plurality of primary parts, they can be driven, for example, independently of one another as a plurality of separate motors or else jointly as one motor. In an arrangement of a plurality of primary parts in a plane, which has, for example, an x axis and a y axis, a two-dimensional movement can be realized by the total number of primary parts being split into two groups. A first group is provided for movements in the x axis, and a second group is provided for movements in the y axis. Correspondingly this also results in the alignment. These two groups are, for example, distributed in the xy plane in a checkered pattern. An active face of the secondary part is then correspondingly split into two regions for the x movement direction or y movement direction.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows a first profile of magnetic fields in the linear motor;

FIG. 4 shows a second profile of magnetic fields in the linear motor;

FIG. 5 shows a profile over time of flux, induced voltage and power as the electrical angle changes;

FIG. 6 shows an illustration of the force development;

FIG. 9 shows a linear motor with a primary part having a pole shoe;

FIG. 10 shows a geometry of a linear motor with a direct-axis flux alignment;

FIG. 10*a* shows a field distribution of a linear motor of FIG. 10;

FIG. 11 shows a linear motor with different winding phases for different phases;

FIG. 13 shows a geometry of a linear motor with yoke magnets with flux concentration, FIG. 13*a* shows a field distribution of a linear motor of FIG. 13;

DETAILED DESCRIPTION OF PREFERRED EMBODIMENTS

Figure 1:
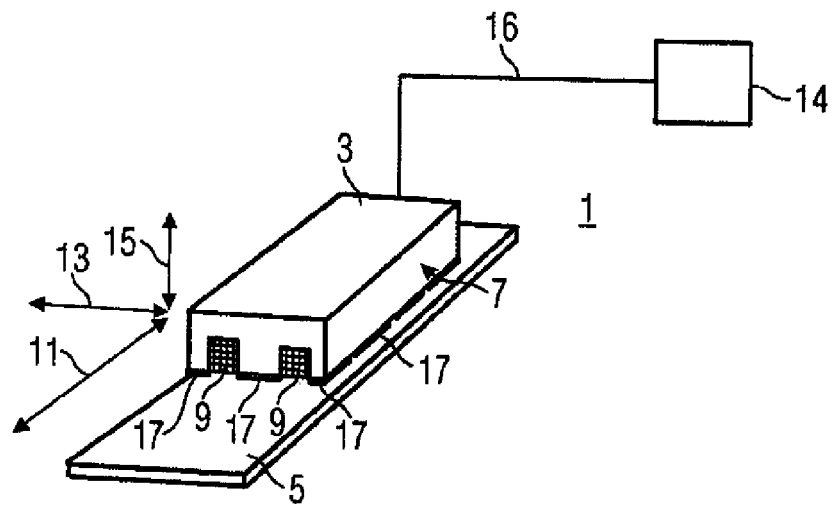
FIG. 1 shows a basic illustration of a linear motor.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
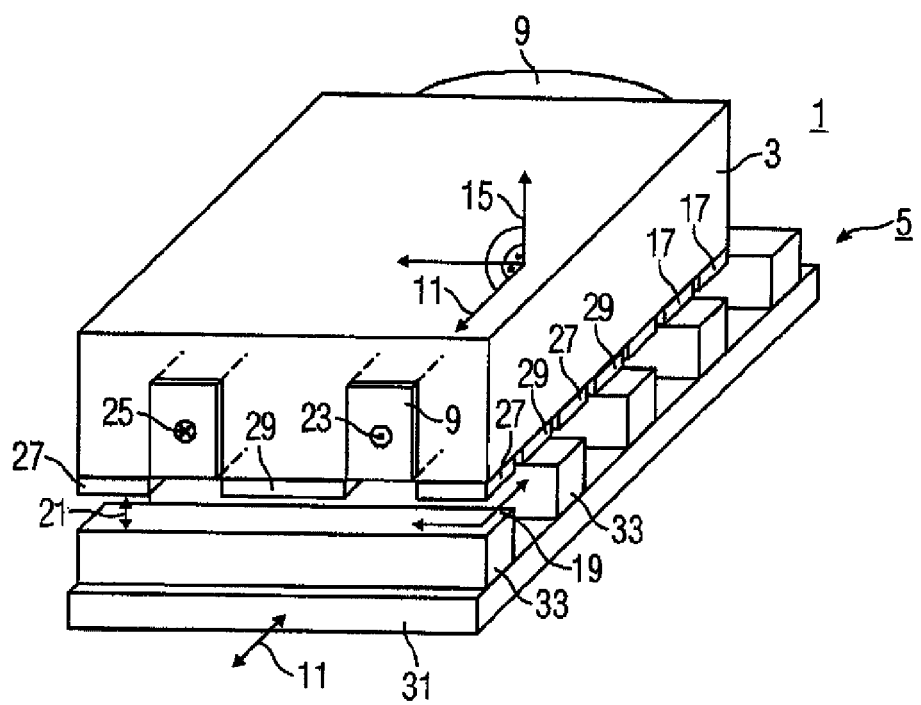
FIG. 2 shows a linear motor with permanent magnets on the primary part.

Turning now to the drawing, and in particular to FIG. 1, there is shown an electric machine, generally designated by reference numeral 1 and including a primary part 3 and a secondary part 5. The primary part 3 has a winding 9 and permanent magnets 17. The movement direction of the primary part 3 is identified by means of a double arrow, which runs in the longitudinal direction 11. A further double arrow indicates the transverse direction 13. The normal 15 is determined by means of a third double arrow, the normal being based on an air gap plane 19, the air gap plane 19 not being illustrated in FIG. 1. The air gap plane 19 is illustrated in FIG. 2, however. An arrow indicates a side view 7, which relates to the illustration shown in FIGS. 3 and 4. The electric machine 1 is a linear motor which can be driven by means of a power converter 14, which is connected via a connection cable 16.

The illustration in FIG. 2 shows a variation of the electric machine 1. The primary part 3 is constructed in the form of a laminate stack, the primary part 3 having a winding 9. The winding 9 is a phase winding, it being possible for an alternating current to be applied to this phase winding. The direction of the current is illustrated in FIG. 2 at one instant. In this case, the direction is identified by means of a dot 23 or by means of a cross 25. The laminated primary part 3 has permanent magnets 17 on the side facing the secondary part 5. The permanent magnets 17 are fitted to the primary part such that their magnetization alternates in the direction of the normal 15. The magnets (permanent magnets) therefore produce a magnetic flux which alternately points upward (toward the primary part 3) and downward (toward the secondary part 5). North/south permanent magnets (N/S) 27 (the magnetization direction points toward the secondary part) therefore alternate with the south/north permanent magnets (S/N) 29 (the magnetization direction points toward the primary part). An air gap 21 is formed between the primary part 3 and the secondary part 5. This air gap 21 covers the air gap plane 19. The movement of the electric machine 1, which in the present case is a linear machine, takes place in the direction of the longitudinal direction 11. In this case, it is possible either for the primary part 3 to be stationary and for the secondary part 5 to move or for the secondary part 5 to be stationary and for the primary part 3 to move beyond the secondary part 5. The winding 9 is a first means for producing a first magnetic field, and the permanent magnets 17 are further means, for producing further magnetic fields. The illustration in FIG. 2 shows a quadrature-axis flux embodiment of the electric machine 1. In the quadrature-axis flux embodiment, the secondary part 5 is designed, for example, such that it has a mount 31 and bars 33. At least the bars 33 have a laminated design. The lamination is such that laminate follows on from laminate in the longitudinal direction 11. The bars 33 are adhesively bonded or soldered or welded, for example, to the mount 31 or connected to one another using a combination of fixing possibilities. The lamination is advantageous for avoiding eddy currents. If the negative eddy current effects are not very pronounced (for example in applications with a sufficiently low electrical fundamental frequency), a lamination can be dispensed with, and inexpensive solid parts can be used.

The illustration in FIG. 3 shows, as a detail, a primary part 3 and a secondary part 5. This detail in FIG. 3 reproduces schematically how magnetic fields can be split in a primary part 3, in this case the form of a side view being selected which corresponds to a side view 7 in FIG. 1. FIG. 3 shows one turn of a winding 10. Also shown is the fact that the primary part 3 and the secondary part 5 can be split into sections. The primary part has primary sections 47, 49, 51 and 53, these primary sections 47, 49, 51 and 53 relating to the permanent magnets 27, 29. The sections are in this case regions in which, corresponding to the magnetization direction of the permanent magnets 27 and 29, the magnetic flux either passes away from the secondary part 5 or toward the secondary part 5. The profile is illustrated by arrows 41, 43. The sum of all the magnetic fluxes interlinked with the winding 10 forms a linkage flux ψ. The linkage flux is primarily produced by the magnets which can form a magnetic return path via the secondary part 5. The flux arrows of different lengths show the flux interlinked with the winding (coil) for each magnet. The secondary part 5 also has sections corresponding to the bars 33 provided. These secondary sections 55, 57, 59 and 61 therefore correspond to the sections in which a bar 33 is provided or is not provided. A magnetic flux can be guided by means of the bars 33. In the present example, the guidance of the magnetic flux takes place at right angles to an illustrated X axis 63. The flux therefore runs at right angles to the plane of the page on which the FIG. is illustrated, this corresponding to a Y axis 65. The Z axis is at right angles to the X and Y axis, with the result that all the axes are at right angles to one another. A magnetic excitation flux, which is brought about, for example, by a north/south permanent magnet 27, is closed via the bar 33 and the primary part 3 in a section 47 in conjunction with the section 55. In this case, the primary part 3 has, for example downstream of a first north/south permanent magnet 27 (N/S permanent magnet), a further permanent magnet, which is magnetized in the opposite direction, with the result that it is an S/N permanent magnet 29. Such a permanent magnet 29 is not illustrated in FIG. 3, however, since it comes to lie behind. A narrow air gap 35 results at the positions where a bar 33 is opposite a permanent magnet 27, 29. A further air gap 37 is realized at adjacent positions without a bar 33. As a result of the fact that the air gaps 35 and 37 are unequal, magnetic fluxes 41 and 43 differing in strength are produced in sections 47, 51 and 49, 53 by permanent magnets 27 and 29. The resultant flux 39 is given as the sum of all the fluxes 41 and 43.

The illustration in FIG. 3 shows the magnetic excitation flux 41, 43 temporally at the time and for the position of the primary part 3 and the secondary part 5 at/in which a current in the winding 10 has a zero crossing. The positionally dependent profile of the magnetic excitation flux or of the induced voltage in the winding and of the power converted in the process of a motor through which current is flowing are illustrated in FIG. 5. For the position illustrated in FIG. 3 of the secondary part X=0, a negative linkage flux ψ results and, for the position $X=\tau_M$ (which is illustrated in FIG. 4), a positive flux ψ results. The illustration in FIG. 4 shows the secondary part 5 therefore in a position $X=\tau_M$. If the secondary part 5 therefore moves by a magnetic pole pitch, as a result the flux linkage 39 of the coil (winding 10) changes gradually from a negative to a positive value. As the change takes place, geometrical parameters such as magnet width, air gap, tooth width (width of the bars 33), etc., can be influenced. In an advantageous configuration, a change which is as sinusoidal as possible is desired.

The illustration in FIG. 5 shows, in three graphs, the magnetic linkage flux ψ, the resultant induced voltage $U_i$ and the electrical power $P_{el,ph}$ of a winding phase/a winding, in a profile over time. The profile over time is represented by the phase position of the voltage being indicated. The profile of the flux ψ also reproduces the profile of the magnetic field 90, which can be produced, for example, by means of permanent magnets. For the optimum formation of force of a winding phase, the current needs to be impressed in phase with the induced voltage. Furthermore, the positions X=0 and $X=\tau_M$ are shown, these positions, together with the further illustrated profiles of flux ψ, voltage $U_i$ and electrical power $P_{el,ph}$ relating to the symbolic illustration in FIGS. 3 and 4. It can be seen from the third graph, on which the electrical power is plotted, that the number of motor winding phases m needs to be greater than and/or equal to two for a constant power (~force). Advantageously, three winding phases are selected since three-phase converters require fewer semiconductor valves than two-phase or polyphase converters.

The illustration in FIG. 6 serves the purpose of showing the technical principle and shows the production of a force F. In order to make the formation of force in the longitudinal direction of a linear motor slightly clearer, an auxiliary model is represented. A permanent magnet 27 is replaced by currents on an outer surface associated with it. The permanent magnet 27 can therefore be represented in imaginary fashion, for example, by a square, current flowing on the side faces of the square 69, as illustrated. In a model 71, the permanent magnet 27 can therefore be represented by a winding, in accordance with the model the direction of the current within the winding being represented by a dot 23 or a cross 25. In the illustration 2D, the magnet is reduced to the conductor cross section of the equivalent currents. If the magnets are now substituted in the side view of the primary part, the following arrangement results. The magnetic field produced by the winding 9 is concentrated in the air gap 21 at the points of the bars 33, which are used as flux concentrating pieces, since here the reluctance is at its smallest. The fictitious conductors therefore lie in the field of the phase coil, strengthen it on one side and weaken it on the other side. The conductors "expand" in the region having a lower field strength, which is illustrated by the direction of the force F acting on the primary part in FIG. 6. This relationship is also described by the "right-hand rule", in which the current, the magnetic field and the force F are at right angles to one another. In the position $X=\tau_{M/2}$ of the primary part 3 and the secondary part 5 in relation to one another shown in FIG. 6, the winding phase current, i.e. the current through the winding 9, reaches its maximum.

Figure 7:
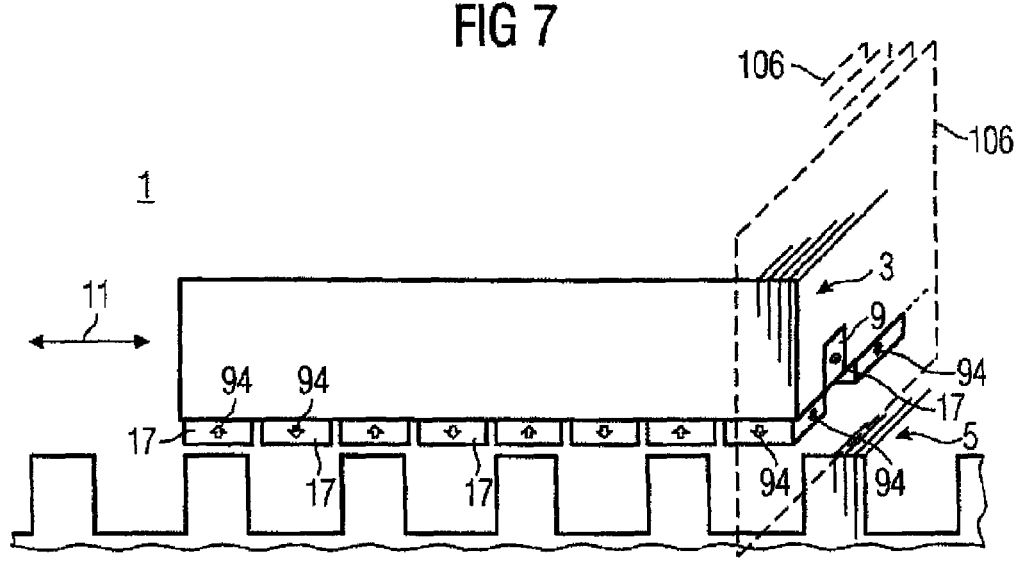
FIG. 7 shows a geometry and field distribution of a linear motor with a quadrature-axis flux alignment.
Figure 7A:
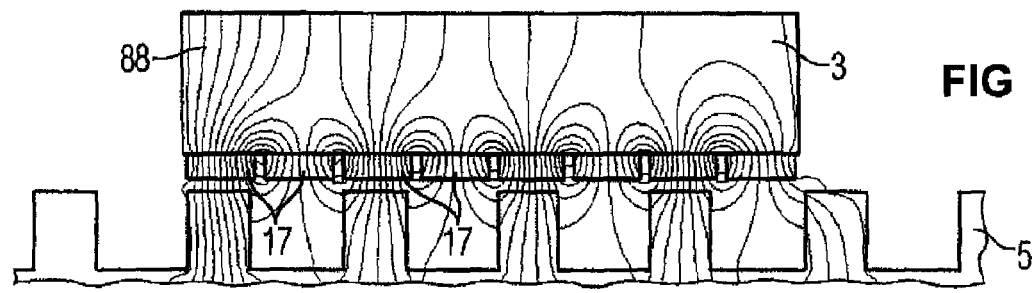
FIG. 7*a* shows a field distribution of a linear motor of FIG. 7.

FIG. 7 shows, schematically, the geometry of a quadrature-axis flux linear motor 1 and FIG. 7a a magnetic excitation field 88, which is produced by the permanent magnets 17. A useful magnetic flux is guided in a plane (106) aligned transversely with respect to a movement direction (11). The useful magnetic flux is the magnetic flux which is coupled to or interlinked with the coil 9. This useful magnetic flux aligned in such a way forms a quadrature-axis flux magnetic circuit.

The excitation field 88 in FIG. 7 is the further magnetic field or the further magnetic fields. The linear motor 1 has a laminated primary part 3 and a laminated secondary part 5. The stacking direction of the laminate stacks is indicated in basic form. The magnetization direction 94 of the permanent magnets 17 is illustrated by means of arrows. The possible movement direction of the primary part is the longitudinal direction 11.

Figure 8:
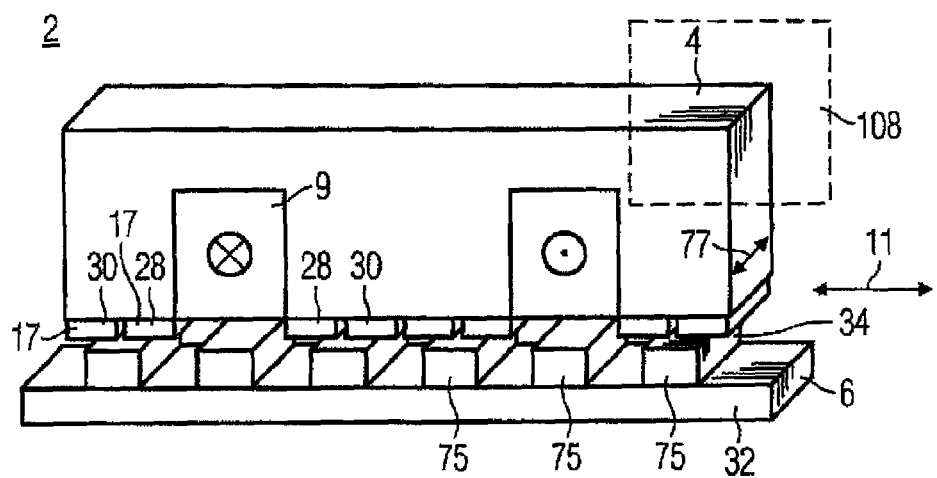
FIG. 8 shows a perspective view of a linear motor with a direct-axis flux alignment.

The illustration in FIG. 8 shows a primary part 4 and a secondary part 6. The primary part 4 and the secondary part 6 form the electric machine 2, the electric machine 2 having a direct-axis flux arrangement. The direct-axis flux arrangement is characterized in particular by the fact that the magnetic fields are not closed transversely with respect to the movement direction of the primary part or the secondary part, but along the movement direction of the primary part or along the movement direction of the secondary part. The magnetic flux which is guided in a plane 108, the plane 108 being oriented parallel to the movement direction 11, is a useful magnetic flux. The useful magnetic flux is the magnetic flux which is coupled to the coil 9. This useful magnetic flux aligned in such a way forms a direct-axis flux magnetic circuit.

In FIG. 8, the secondary part 6 is laminated both in the region of the mount 32 and in the region of the bars 34. The arrangement of the magnets in the air gap plane is not checkered but strip-shaped, in contrast to the quadrature-axis flux arrangement. In the direct-axis flux variant, the magnets are aligned substantially parallel to the bars (flux concentrating pieces). In order to reduce force ripples, however, the magnets can be positioned in a targeted manner in a type of skewed position.

In a further advantageous configuration, the secondary part 6 is produced from laminates, which are stacked one behind the other over the motor width. In the case of such laminates, the mount 32 and the teeth 75 comprise one part. Owing to the laminates being stacked one behind the other, the toothed structure of the secondary part with the bars 34 results. The type of lamination is indicated in FIG. 8. The secondary part may have a multi-part design, for example, in the longitudinal direction, with the result that a secondary part 6 adjoins a subsequent secondary part. Such further secondary parts adjoining one another in the movement direction are not illustrated in the illustration in FIG. 8, however. The illustration in FIG. 8 further shows the permanent magnets. The permanent magnets are N/S permanent magnets 28 or S/N permanent magnets 30. These permanent magnets extend, for example, over an entire laminate stack width 77 of the primary part 4.

The illustration in FIG. 9 shows a further development of an electric machine 2 from FIG. 8. The primary part 4 is in this case designed such that it has pole shoes 79. The pole shoes 79 widen the bearing face for permanent magnets 28, 30. As a result, the force yield of the electric machine 2 can be increased. Since, owing to the surface for positioning the permanent magnets being increased in size, the region in which a winding 9 can be inserted in the primary part is narrowed, the primary part 4 is advantageously designed such that it has a coil former 81. The coil former 81 has both a pole shoe 79 and a winding neck 84. The winding 9 can be wound around the winding neck 84 and then inserted into the primary part 4. The coil former 81 is advantageously held in the primary part by means of lugs 83. In FIG. 9, the winding 9 is referred to as a winding phase U of a motor. Further motor winding phases (for example V and W) can be realized by primary parts 4 having an identical design, but are not illustrated. In the position illustrated, the permanent magnets 28 and 30 produce the magnetic excitation fluxes 86, whose sum forms the flux linkage $\psi$ of the coil 9. As can be seen from the illustration in FIG. 9, the magnetic excitation fluxes 86, which represent a useful flux, form a direct-axis flux magnetic circuit.

The illustration in FIG. 10 shows a linear motor 2 with a direct-axis flux magnetic circuit. This corresponds to the illustration in FIG. 9. In FIG. 10a illustrates the distribution of the further magnetic fields 92. These further magnetic fields 92 are the magnetic excitation field, which has been brought about by the permanent magnets 17.

The illustration in FIG. 11 shows a further exemplary embodiment of an electric machine 2, this electric machine now being constructed with three winding phases U, V and W. Each winding phase is provided for one phase of a three-phase power supply system. The required phase shift is achieved by the geometrical offset of the winding phases. The geometrical offset $\Delta x$ in this case corresponds to 120° electrical for the three-phase machine illustrated. FIG. 11 differs with respect to FIG. 10, for example, also by virtue of the fact that not only one tooth-wound coil 9 is associated with each winding phase U, V and W, but its two tooth-wound coils 12 and 14 for in each case one winding phase U, V and W.

Figure 12:
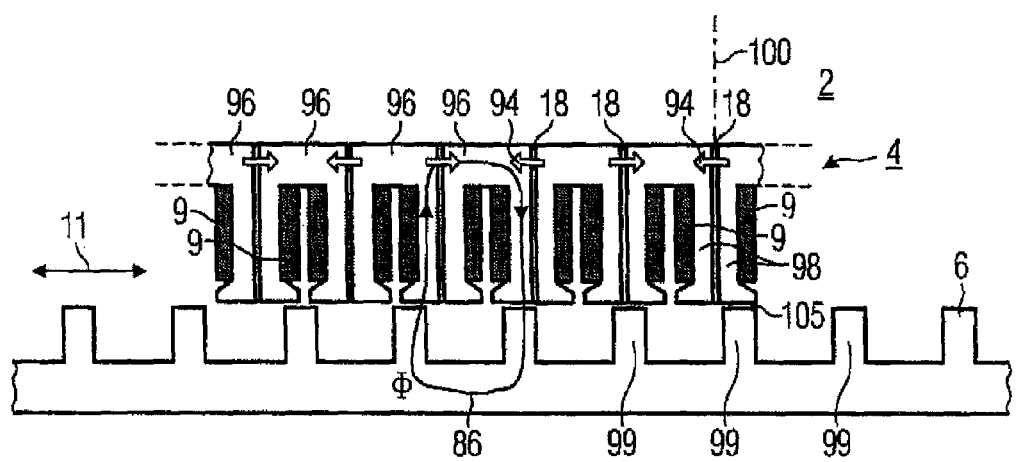
FIG. 12 shows a geometry of a linear motor with tooth magnets with flux concentration.
Figure 12A:
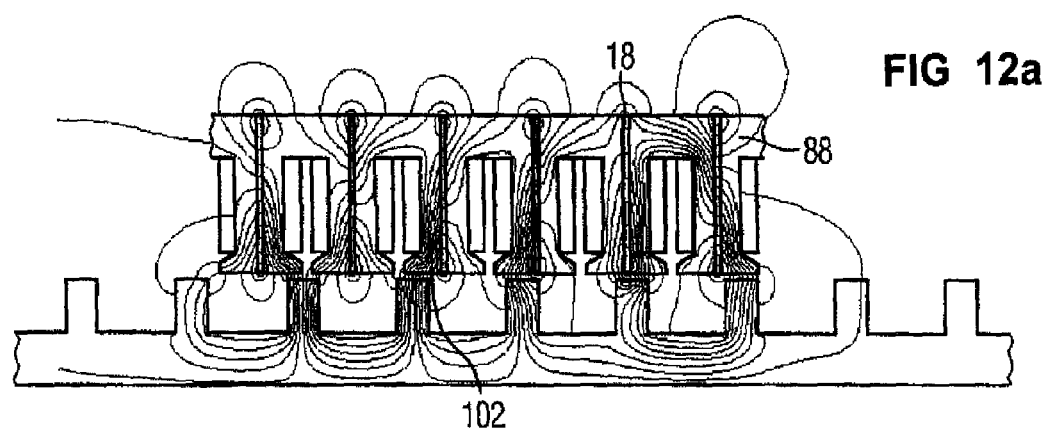
FIG. 12*a* shows a field distribution of a linear motor of FIG. 12.

The illustration in FIG. 12 shows an electric machine 2 in the form of a linear motor, in this case tooth magnets 18 being used as the permanent magnets. The tooth magnets 18, which are even also permanent magnets, are located between, for example, laminated soft-iron material 96. The further magnetic field 86 produced by the tooth magnets 18 is characterized by lines with arrows. The magnetization direction 94 of the permanent magnets 18 is likewise illustrated by arrows. The tooth magnets 18 are positioned essentially centrally in a tooth 98 and run essentially parallel to a coil axis 100 of the tooth-wound coil 9. The tooth 98 is surrounded by a tooth-wound coil 9. FIG. 12 shows the geometrical design, whereas FIG. 12a shows the profile of the magnetic excitation field 88. The magnetic excitation field 88 is the further magnetic field which is produced by means of the tooth magnets 18. The illustration of the excitation field 88 in this case shows clearly the effect of the flux concentration 102. The flux concentration is determined by the magnetic circuit geometry. Influencing variables are in this case, for example, the magnet dimensions and the laminate dimensions. The magnetization direction 94 of the tooth magnets 18 (the tooth magnet is a permanent magnet) is primarily parallel to an air gap plane of the air gap 105.

The tooth pitch of the secondary part 6 of the electric machine 2 shown in FIG. 12 is not an integral multiple of the magnet pitch of the primary part 4. This applies in particular to the mean value if the tooth pitch or magnet pitch is not constant.

Current can be applied to the coils 9 with one and/or more phases. The assignment of the coils to individual motor winding phases is dependent on the tooth pitch ratio between the primary part 4 and the secondary part 6 selected. The illustration in FIG. 12 shows, in the case of the teeth 98 of the primary part 4, a different tooth pitch than in the case of the teeth 99 of the secondary part 6. In this case, a polyphase electric machine can be realized both for an identical tooth pitch and for an unidentical tooth pitch on the primary and secondary part. An identical tooth pitch is illustrated, for example, in FIG. 7 and FIG. 11.

The illustration in FIG. 13 differs from the illustration in FIG. 12 essentially by virtue of the fact that, instead of tooth magnets, yoke magnets 20 are now used as the further means for producing further magnetic fields. The yoke magnets 20 are also permanent magnets and are positioned in the region of a yoke 104. The yoke 104 is used for connecting teeth 98. In FIG. 13a, As a result of the positioning of the magnets in FIG. 13, compared to FIG. 12, a different excitation field 88 is realized, as shown in FIG. 13a.

Figure 14:
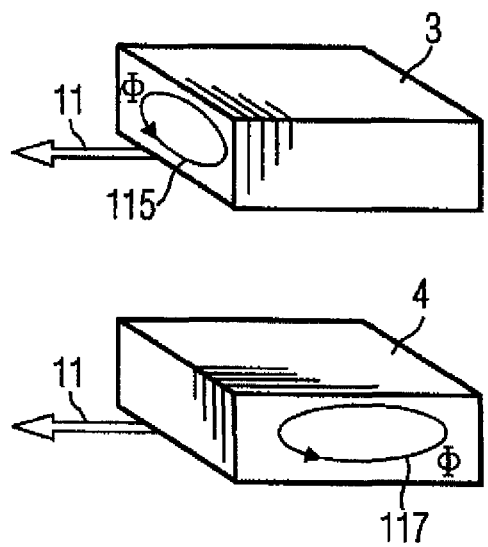
FIG. 14 shows a comparison of a primary part with a quadrature-axis flux magnetic circuit and a primary part with a direct-axis flux magnetic circuit.

The illustration in FIG. 14 shows, schematically, a comparison of a primary part 3 with a quadrature-axis flux magnetic circuit 115 and a primary part 4 with a direct-axis flux magnetic circuit 117. The primary parts 3, 4 are in particular the primary part 3, 4 of a permanent excited synchronous motor (not illustrated in FIG. 14), which has permanent magnets in the primary part. The permanent magnets are also not illustrated in FIG. 14. The magnetic flux $\Phi$ is in each case only indicated symbolically. Further means for producing the magnetic flux $\Phi$, such as windings to which current can be applied, for example, are also not illustrated for reasons of improved clarity. A possible movement direction 11 is indicated by an arrow. A secondary part, which is associated with the respective primary parts 3 and 4, is not illustrated in FIG. 14. The illustration also shows the fact that, in the case of a lamination of the primary parts 3 and 4, the embodiment of this lamination depends on the alignment of the respective magnetic circuit 115 and 117. In the case of the quadrature-axis flux magnetic circuit 115, the magnetic excitation flux $\Phi$ is primarily closed in a plane aligned transversely with respect to the movement direction 11. The motor laminates used for the lamination of the primary part 3, 4 follow the flux plane and are stacked, for example, in a longitudinal extent of the primary part 3, the longitudinal extent being the extent of the primary part 3 in the movement direction 11.

Figure 15:
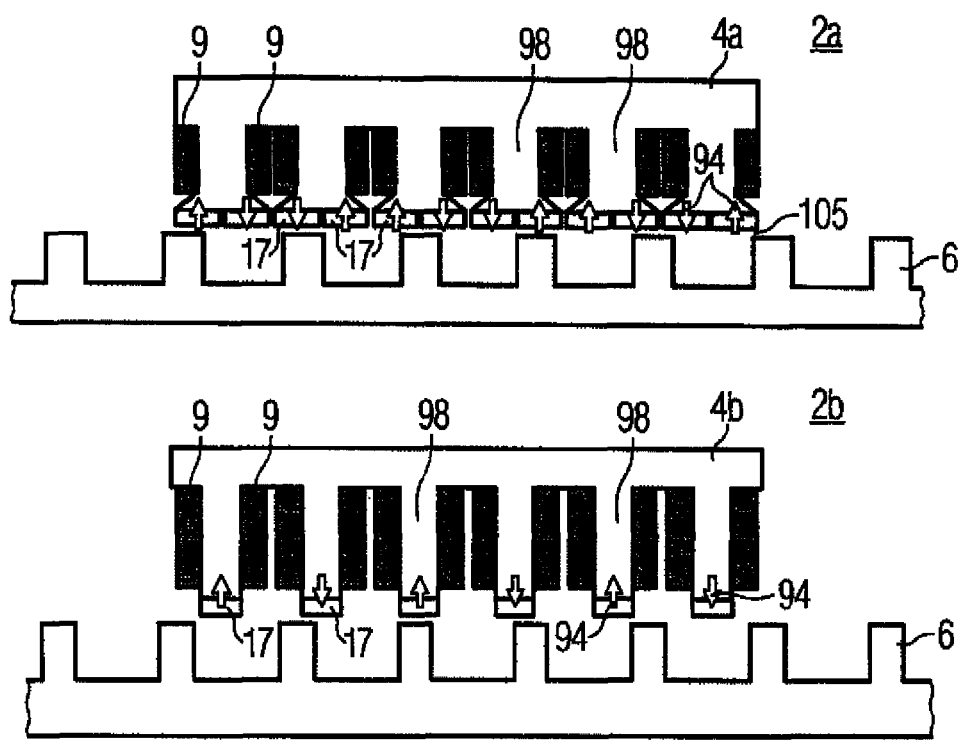
FIG. 15 shows a comparison of electric machines with an alternating flux arrangement and a unidirectional flux arrangement.

The illustration in FIG. 15 shows a comparison of electric machines 2a and 2b, the two electric machines 2a, 2b being linear motors. The electric machine 2a has a primary part 4a, which has teeth 98, permanent magnets 17 being fitted to in each case one tooth 98, which permanent magnets have a different magnetization direction 94. The permanent magnets 17 are fitted on that side of the primary part which faces an air gap 105. The magnetization direction 94 of the permanent magnets 17 is primarily at right angles to an air gap plane.

As shown in FIG. 15, in each case a tooth-wound coil 9 is wound around the teeth 98. Since each of the teeth 98 now has permanent magnets 17 with opposite magnetization directions 94, in the event of a movement of the primary part 4a in relation to the secondary part 6, an alternating magnetic flux results. The electric machine 2a therefore has an alternating flux arrangement.

An alternating magnetic flux is produced, by means of the permanent magnets 17, which are used for forming a (magnetic) excitation field, in the event of a relative movement of the secondary part 6 in relation to the primary part 4a, in the magnetic circuit. The magnetization directions 94 of the individual permanent magnets 17 are therefore aligned such that, owing to a movement of the toothed secondary part 6, an alternating magnetic flux is produced in the coil-bearing magnetic circuit sections of the primary part 4a.

The electric machine 2b in FIG. 15 also has a primary part 4b, which has teeth 98. In contrast to the electric machine 2a, the teeth 98 in the electric machine 2b have only one permanent magnet 17 for each tooth 98. Since the permanent magnet 17 has a magnetization direction 94, only one magnetization direction 94 is associated with each tooth 98. An electric machine 2b can also be designed such that a tooth 98 has a plurality of permanent magnets, which, based on a tooth 98, have the same magnetization direction, however. This variant embodiment is not explicitly illustrated in FIG. 15. In the case of the electric machine 2b, the magnetization directions 94 also alternate with the teeth 98 on the primary part 4b. Each tooth therefore alternately has a different magnetization direction 94. Since the teeth 98 now have permanent magnets 17 with opposite magnetization directions 94, in the event of a movement of the primary part 4b in relation to the secondary part 6, a magnetic unidirectional flux results. The electric machine 2b therefore has a unidirectional flux arrangement. In the event of a relative movement of the secondary part 6 in relation to the primary part 4b, a magnetic unidirectional flux is produced in the magnetic circuit by means of the permanent magnets 17, which serve the purpose of forming a (magnetic) excitation field. In the case of the electric machine 2b in FIG. 15, the magnetization directions 94 of the individual permanent magnets 17 are aligned such that, owing to a movement of the toothed secondary part 6, a magnetic unidirectional flux is produced in the coil-bearing magnetic circuit sections of the primary part 4b, the magnetic unidirectional flux not changing its direction and oscillating periodically between a maximum and a minimum value.

Figure 16:
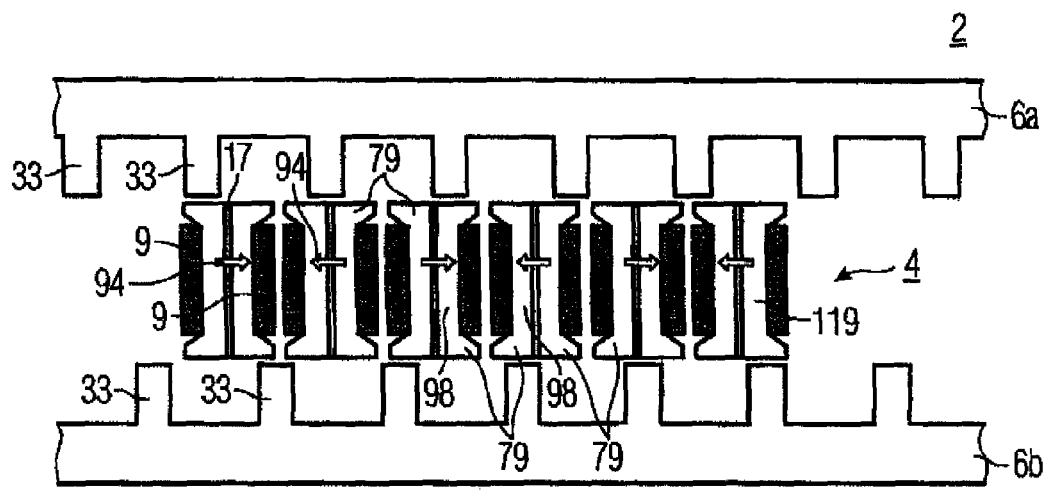
FIG. 16 shows an electric machine with secondary parts arranged on two sides.

In the illustrations shown in FIG. 15 or also FIG. 12, an arrangement is selected in which a force effect can be achieved between a primary part and a secondary part. The illustration in FIG. 16 shows an arrangement of an electric machine which has a primary part 4 and two secondary parts 6a and 6b. A force effect therefore results between only one primary part 4 and two secondary parts 6a and 6b. This results in the force which can be produced being approximately doubled. The teeth 98 of the primary part 3 of the linear motor shown in FIG. 16 each have two pole shoes 79, a secondary part 6a or 6b facing each pole shoe 79. This embodiment of the electric machine 2 shown in FIG. 16 is a type of development of the electric machine 2 shown in FIG. 12. The arrangement of the secondary parts on two sides is in this case not restricted to the embodiment illustrated in FIG. 16 of the primary part 4, in which the permanent magnets 17 are embedded in a soft-magnetic material 119. Primary parts are also conceivable which have permanent magnets on the pole shoes. Such an embodiment is not illustrated in FIG. 16, however.

Figure 17:
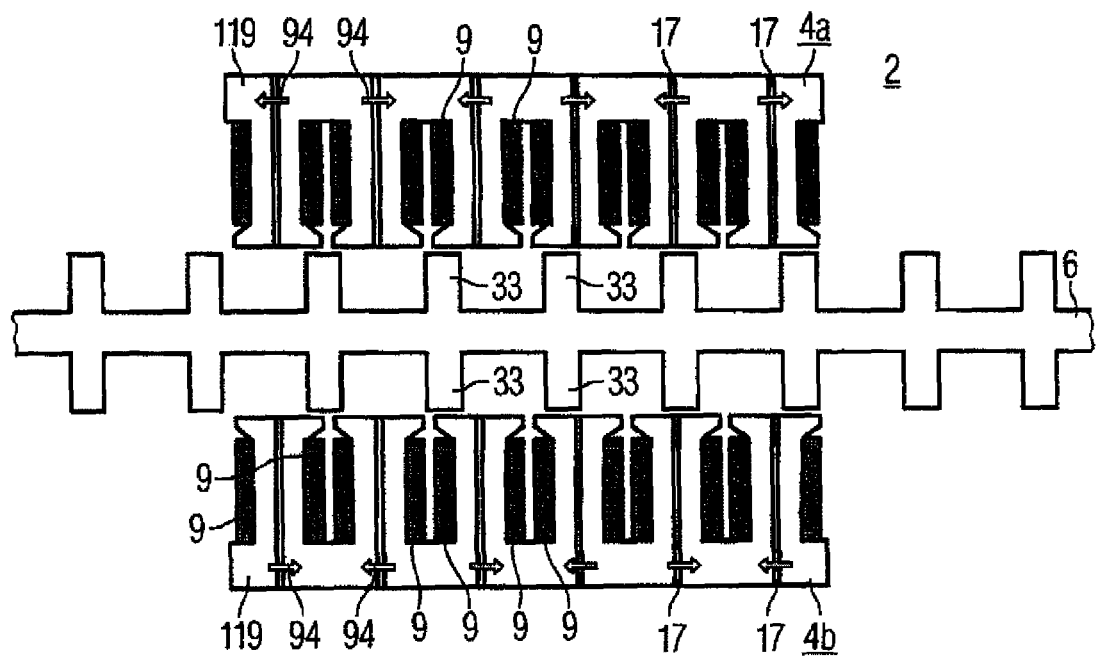
FIG. 17 shows an electric machine with primary parts arranged on two sides.

The illustration in FIG. 17 shows an arrangement of an electric machine 2 which has two primary parts 4a and 4b and only one associated secondary part 6. A force effect therefore results between only one secondary part 6 and two primary parts 4a and 4b. This results in the force which can be produced being approximately doubled. The teeth 3 of the secondary part of the linear motor 2 shown in FIG. 16 have an alignment on both sides with respect to in each case one primary part 4a and 4b. Teeth 33 of one secondary part 5 are therefore associated with each primary part 4a and 4b. This embodiment of the electric machine 2 shown in FIG. 17 is a type of development of the electric machine 2 shown in FIG. 12. The arrangement of the primary parts 4a and 4b on two sides is in this case not restricted to the embodiment of the primary part 4a illustrated in FIG. 16, in which the permanent magnets 17 are embedded in a soft-magnetic material 119. Primary parts are also conceivable which have, for example, permanent magnets on the pole shoes, as in FIG. 10. Such an embodiment is not illustrated in FIG. 17, however.

Figure 18:
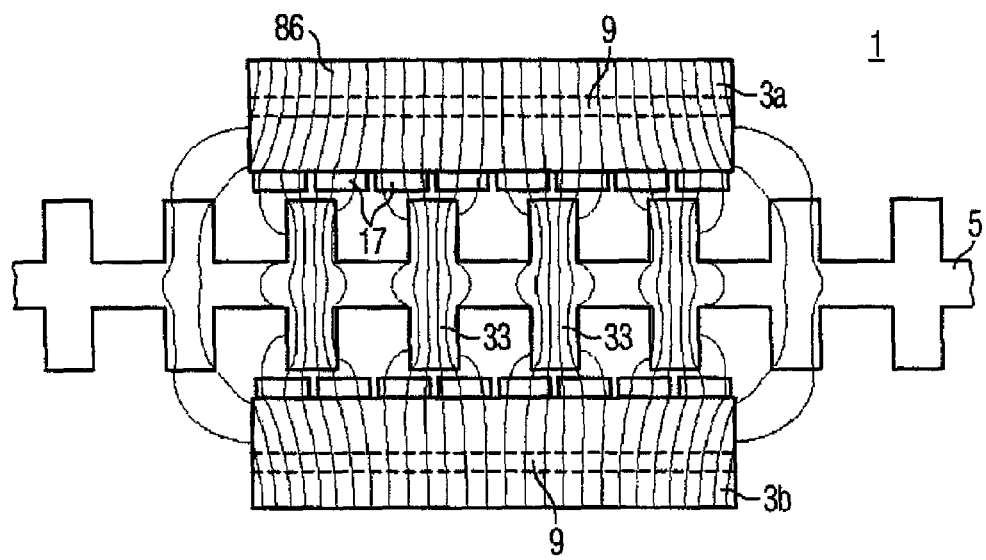
FIG. 18 shows a magnetic field profile of a quadrature-axis flux magnetic circuit arrangement, which is brought about by an electrical current.

The illustration in FIG. 18 shows, by way of example, the magnetic field profile in an electric machine 1 which has two primary parts 3a and 3b and a secondary part 5. The primary parts 3a and 3b have permanent magnets 17 and a winding 9. In the illustration in FIG. 18, the magnetic flux 86 is illustrated which results owing to a current through the winding 9 (illustrated by dashed lines) of the primary parts. In the case of the magnetic flux 86 illustrated in FIG. 18, the magnetic flux brought about by the permanent magnets is not taken into consideration.

Figure 19:
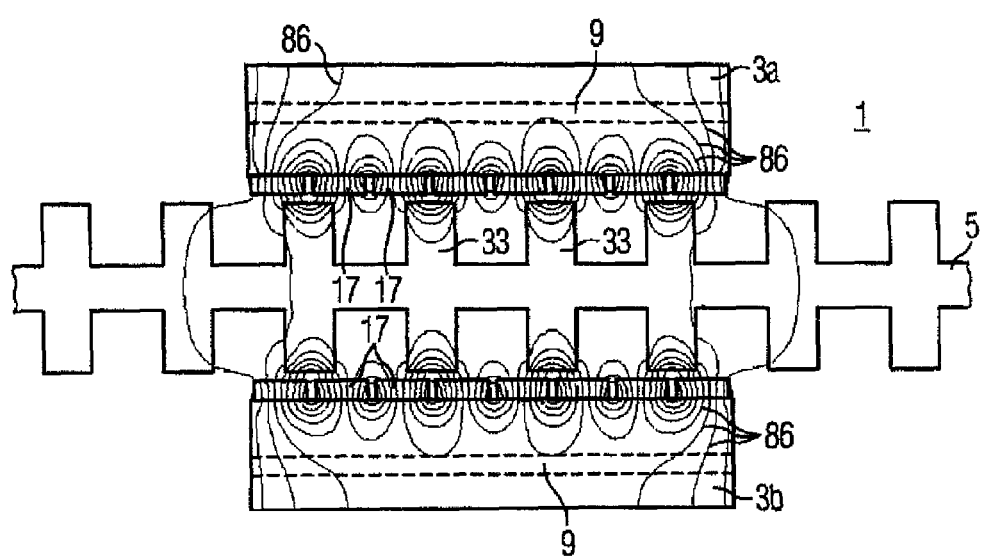
FIG. 19 shows a magnetic field profile of a quadrature-axis flux magnetic circuit arrangement, which is brought about by permanent magnets.

The illustration in FIG. 19 shows, as FIG. 18, by way of example the magnetic field profile in an electric machine 1 which has two primary parts 3a and 3b and a secondary part 5, the magnetic field profile illustrated in FIG. 19 only arising from the permanent magnets 17. In the case of the magnetic flux 86 illustrated in FIG. 19, the magnetic flux brought about by the windings 9, to which current can be applied, of the primary parts is not taken into consideration.

Figure 20:
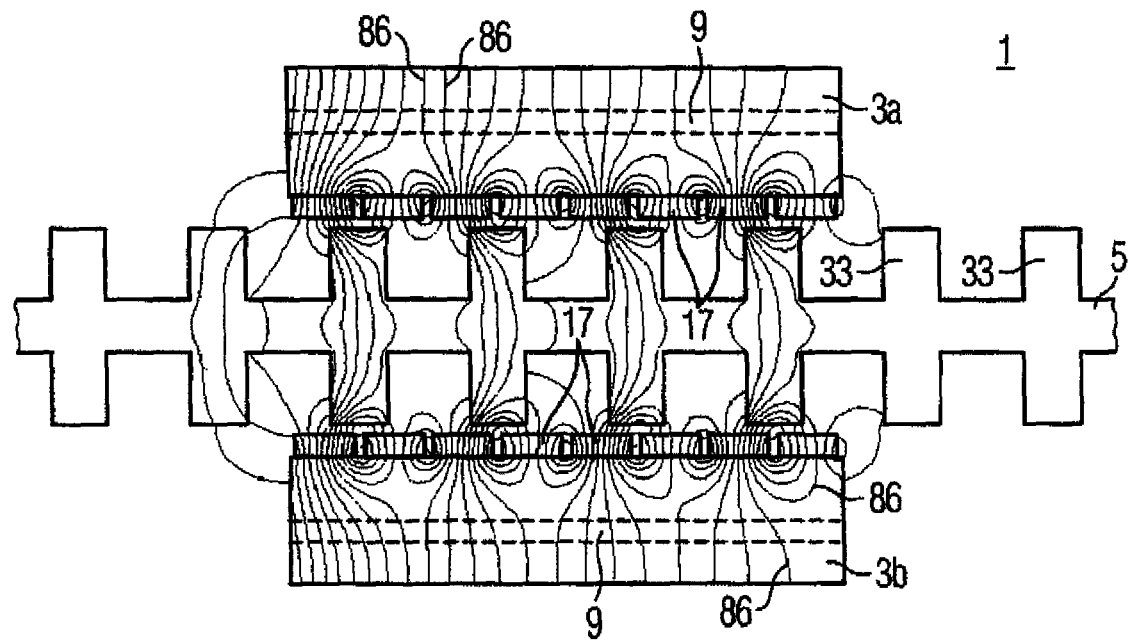
FIG. 20 shows a magnetic field profile of a quadrature-axis flux magnetic circuit arrangement, which is brought about by an electrical current and by permanent magnets.

The illustration in FIG. 20 shows, as FIGS. 18 and 19, by way of example the magnetic field profile in an electric machine 1, the magnetic fields of the permanent magnets 17 and of the winding 9, to which current is applied, now being superimposed. In FIG. 20, the superimposition of the magnetic fields illustrated individually in FIG. 18 and in FIG. 19 is thus shown. Furthermore, FIG. 20 shows the fact that the secondary part 5 is arranged between two primary parts 3a and 3b, this arrangement serving the purpose of forming a common magnetic circuit, which relates to the two primary parts 3a, 3b and the secondary part 5.

Figure 21:
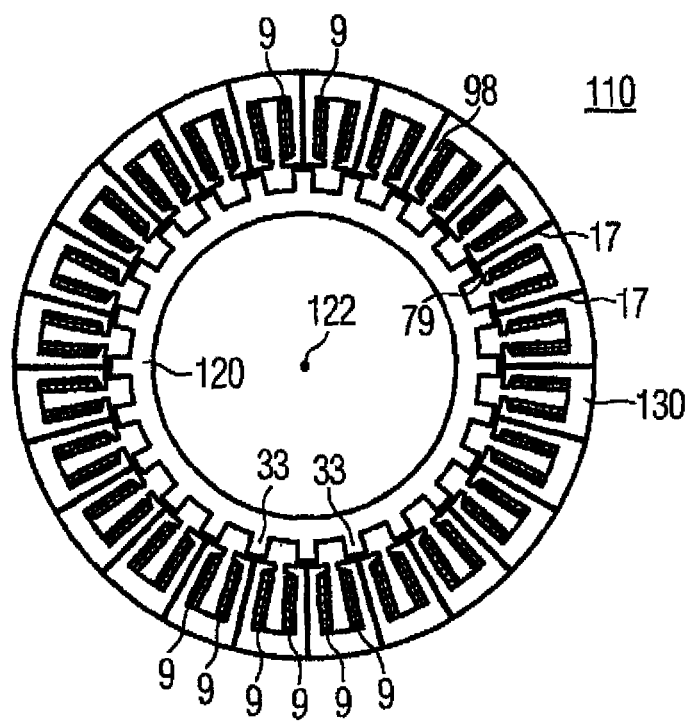
FIG. 21 shows an electric machine, which is a rotary electric machine, the stator having permanent magnets for producing an excitation field.

The illustration in FIG. 21 shows a rotary electric machine 110. This rotary electric machine is, for example, a synchronous motor or else a synchronous generator. The electric machine 110 has a stator 130 and a rotor 120. The rotor 120 can rotate about an axis 122. The rotor 120 is the secondary part of the electric machine 110. The stator 130 is the primary part of the electric machine 110. The rotor 120, as do the secondary parts of the above-described linear motors, has teeth 33. The stator 130 of the electric machine 110 has windings 9 about teeth 98, which have pole shoes 79, and permanent magnets 17. The embodiment of the rotary electric machine 110 in FIG. 21 is only one example of various embodiments of the rotary electric machine. Other embodiments which are not illustrated of the rotary electric machine result, for example, by similarly transferring the embodiments of the linear motors in accordance with the preceding descriptions in relation to the Figures In the case of rotary electric machines, various positionings of the permanent magnets are also possible. Furthermore, it is also possible in the case of rotary machines to specify embodiments in which two secondary parts are assigned to a primary part or in which two primary parts are assigned to a secondary part. These variants are not illustrated in the Figures, however.

Figure 22:
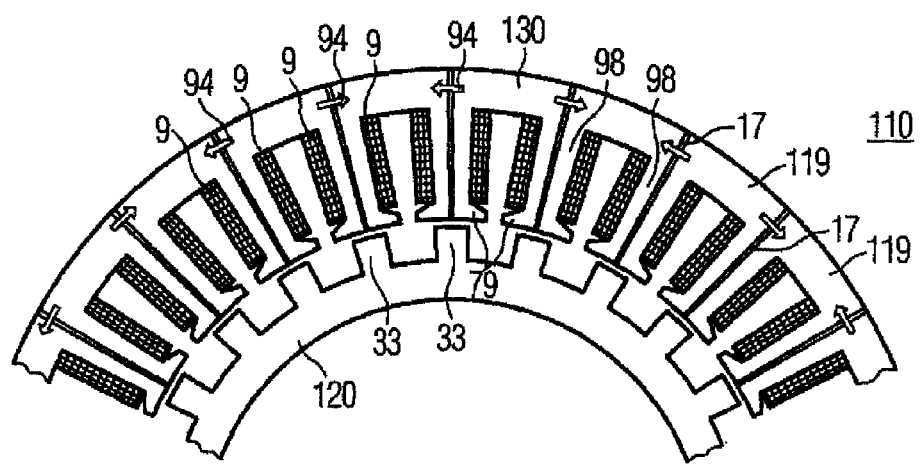
FIG. 22 shows a detail from FIG. 21.

The illustration in FIG. 22 shows a detail from the illustration in FIG. 21. In FIG. 22, the positioning (embedding) of the permanent magnets 17 within a soft-magnetic material is illustrated in more detail. In FIG. 22, the magnetization directions 94 of the permanent magnets 17 are also illustrated, a change in the magnetization direction always taking place from tooth 98 to tooth 98 and also being illustrated.

Figure 23:
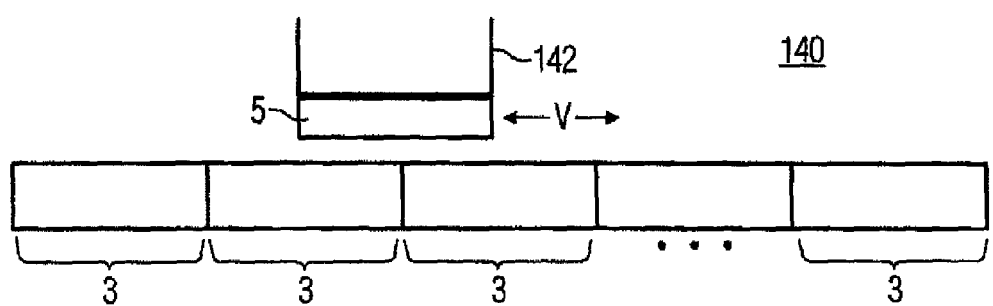
FIG. 23 shows a transport device.

The illustration in FIG. 23 shows an example of a transport and/or positioning device 140. The transport device 140 has at least one primary part 3 or else a plurality of primary parts 3. The primary parts 3 form a conveyor belt. A secondary part 5 is assigned to the primary parts 3. A transport container 142, for example, is located on the secondary part 5. The transport device 140 may also have a plurality of secondary parts 5, this not being illustrated. For the case in which a plurality of primary parts 3 are provided, these can advantageously be driven independently of one another as a plurality of separate motors or else jointly as one motor.

A further advantageous embodiment of the transport and/or positioning apparatus can be realized with a short primary part and a long secondary part path. This results in advantages as regards cost-effective manufacture (less material for the permanent magnets) and an operation- and safety-relevant design (no open magnet path). Such a transport apparatus is not illustrated in FIG. 23, however.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A linear motor, comprising:
    a primary part having teeth, each tooth surrounded by a coil defining a coil axis;
    a permanent magnet arranged in each tooth and surrounded by the coil, with the permanent magnet extending in parallel relationship to the coil axis of the coil; and
    a secondary part having teeth which define with the teeth of the primary part an air gap, said secondary part constructed for guiding a magnetic field, said primary and secondary parts moving in a linear direction relative to one another,
    wherein the permanent magnet defines a magnetization direction in parallel to an air gap plane of the air gap, with the magnetization direction reversing from tooth to tooth,
    wherein the secondary part has a tooth pitch which is different than an integral multiple of a magnet pitch of the primary part, and the tooth pitch of the secondary part is greater than the tooth pitch of the primary part.

2. The linear motor of claim 1, wherein the secondary part has a means for a magnetic return path and is free of magnetic sources.

3. The linear motor of claim 1, further comprising a second said secondary part, with the primary part being arranged between the two secondary parts, thereby forming a common magnetic circuit which relates to the two secondary parts and the primary part.

4. The linear motor of claim 1, further comprising a second said primary part, with the secondary part arranged between the two primary parts, thereby forming a common magnetic circuit which relates to the two primary parts and the secondary part.

5. A transport device, comprising an electric machine as set forth in claim 1.

6. The transport device of claim 5, wherein the electric machine is constructed for two-dimensional movement.

* * * * *

UNITED STATES PATENT AND TRADEMARK OFFICE
CERTIFICATE OF CORRECTION

| | | |
|---|---|---|
| PATENT NO. | : 7,800,256 B2 | Page 1 of 1 |
| APPLICATION NO. | : 11/689122 | |
| DATED | : September 21, 2010 | |
| INVENTOR(S) | : Zeljko Jajtic and Chriatian Volmert | |

It is certified that error appears in the above-identified patent and that said Letters Patent is hereby corrected as shown below:

Title page, on page 2, item [56], under "FOREIGN PATENT DOCUMENTS":

Replace "JP 56 083453" with the correct --JP 55 083453--.

Signed and Sealed this

Twenty-first Day of December, 2010

David J. Kappos
*Director of the United States Patent and Trademark Office*